April 8, 1969        P. A. VINCENT        3,437,908

FEED INDUCTOR FOR STATIC INVERTER

Filed Aug. 23, 1967

INVENTOR.
PETER A. VINCENT
BY
ATTORNEY

United States Patent Office 3,437,908
Patented Apr. 8, 1969

3,437,908
FEED INDUCTOR FOR STATIC INVERTER
Peter A. Vincent, Little Silver, N.J., assignor to The Bendix Corporation, a corporation of Delaware
Filed Aug. 23, 1967, Ser. No. 662,776
Int. Cl. H02m 7/52
U.S. Cl. 321—45                                5 Claims

ABSTRACT OF THE DISCLOSURE

A feed inductor for a static inverter in which primary windings of the feed inductor are connected in series between the output windings for operation on a A.C. flux.

BACKGROUND OF THE INVENTION

Field of the invention

The invention relates to Static Inverters such, for example, as disclosed in Clifton U.S. Patent No. 3,125,726 and more particular to feed inductors utilized in such devices.

Description of the prior art

Heretofore the feed inductors were designed for DC flux, only as disclosed in the aforenoted U.S. Patent No. 3,125,726. The present arrangement permits a smaller and more efficient element.

Summary

The present invention is directed to an improved feed inductor for a static inverter. The arrangement permits the inductor to operate on AC flux rather than DC flux. Also it improves the circuit's performance and is a more efficient design.

Description of the preferred embodiment

Figure 1:
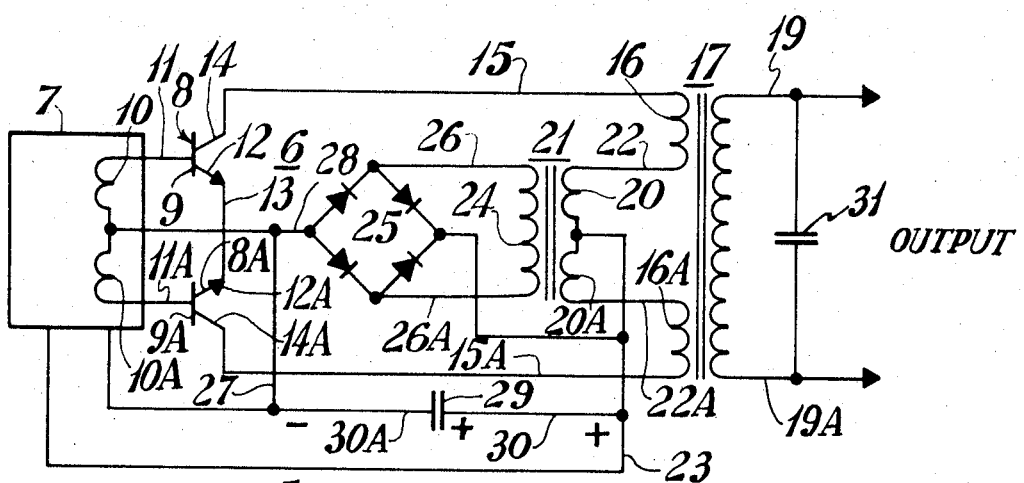
FIGURE 1 is a schematic diagram of the output stage of a static inverter.

Referring now to FIGURE 1, a static inverter is indicated generally by the numeral 5 and includes an output stage 6. Only the output stage is described in detail, the remainder indicated by a block 7 has been omitted for simplicity as it may be any suitable static inverter circuitry.

The output stage 6 comprises one or more push-pull amplifier arrangements, only one being illustrated. Power transistors 8 and 8A each having a base 9 and 9A connected to secondary windings 10 and 10A of a transformer 11 in the preceding stage by conductor 11 and 11A. The transistors 8 and 8A also have emitters 12 and 12A connected together by conductor 13. Collectors 14 and 14A of the transistors 8 and 8A are connected by conductors 15 and 15A to one side of primary windings 16 and 16A respectively of output transformer 17. The transformer 17 has a secondary winding 18 connected to output conductors 19 and 19A. A filter indicated by a capacitor 31 may be connected across the output conductors 19 and 19A.

The other sides of the windings 16 and 16A are connected to one side of primary windings 20 and 20A of feed inductor 21 by conductors 22 and 22A. The other side of the windings 20 and 20A are connected together and also to the + side of the input power source (not shown) by conductor 23. The inductor 21 has a secondary winding 24 connected across the input of a full wave rectifier 25 by conductors 26 and 26A. One output terminal of the rectifier 25 is connected by conductor 27 to the — side of the input power source and also to the midpoint of the windings 10 and 10A by conductor 28. A capacitor 29 is connected across the output terminals of the rectifier 25 by conductors 30 and 30A.

In operation, the feed inductor 24 is connected in the circuit so that each pulse of the input current passes through its primary windings 20 and 20A. Further, the windings 20 and 20A of the inductor 21 support the difference between the input voltage to the inverter and the voltage impressed on the primary windings 16 and 16A when the input voltage is the higher of the two. Upon the voltage impressed on the primary windings 16 and 16A exceeding the input voltage, the feed inductor 21 releases energy to the circuit thereby providing the difference between the inverters input voltage and the voltage on the windings 16 and 16A of the transformer 17.

During the moment of switch-off, the energy stored in the inductance elements of the circuit release energy to the circuit. This function occurs each one-half cycle when the switching elements are driven from the conducting state to the non-conducting state and current flow in the circuit is interrupted. The energy stored in the feed inductor 21 is released at the moment of switch-off to the rectifier 25 where it is rectified and fed back to the input power supply to increase the operating efficiency of the inverter. The capacitor 29 connected across the rectifier 25 provides a means of storing the energy released by the winding 24 so that undesirable transient voltages are not fed directly into the power supply.

Figure 2:
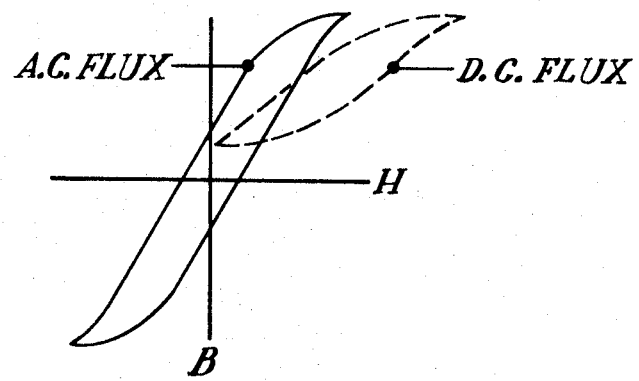
FIGURE 2 is a diagram illustrating the flux pattern.

FIGURE 2 illustrates the flux pattern in the core. The dashed lines illustrate the DC flux pattern. It is apparent that the DC flux is only approximately one-half of that of the AC flux pattern which would represent a less efficient utilization of the inductor. Further by utilizing the AC flux, the output wave form is improved sufficiently, in some application, to eliminate the need for wave traps or harmonic filters in the output of the inverter.

Although only one embodiment of the invention has been illustrated and described, various changes in the form and relative arrangement of the parts, which will now appear to those skilled in the art, may be made without departing from the scope of the invention.

What is claimed is:

1. A feed inductor circuit for use in a static inverter, comprising a push pull input, an output transformer having a pair of primary windings and a secondary winding, a feed inductor having a pair of primary windings and a secondary winding, circuit means connecting said inductor primary windings in series between said output transformer windings across said input, a rectifier having an input and an output, means connecting the input of said rectifier across said inductor secondary winding, and other circuit means connecting the output of said rectifier for feedback to said input.

2. The combination as set forth in claim 1 in which the midpoint between said inductor primary windings is connected to the plus side of a power supply.

3. The combination as set forth in claim 1 in which a capacitor is connected across the output of said rectifier.

4. The combination as set forth in claim 1 in which said rectifier is a full wave rectifier.

5. The combination as set forth in claim 1 in which said feed inductor releases energy to the circuit.

References Cited
UNITED STATES PATENTS

| | | | |
|---|---|---|---|
| 3,120,634 | 2/1964 | Genuit | 321—45 |
| 3,131,343 | 4/1964 | Reinert | 321—16 |
| 3,308,371 | 3/1967 | Studtmann | 321—45 |
| 3,319,147 | 5/1967 | Mapham | 321—6 |
| 3,349,315 | 10/1967 | Studtmann | 321—45 |

JOHN F. COUCH, *Primary Examiner.*

W. M. SHOOP, JR., *Assistant Examiner.*